United States Patent [19]

Fukuda

[11] Patent Number: 5,159,371
[45] Date of Patent: Oct. 27, 1992

[54] SHUTTER FOR CAMERA

[75] Inventor: Tsuyoshi Fukuda, Kanagawa, Japan

[73] Assignee: Canon Kabushiki Kaisha, Tokyo, Japan

[21] Appl. No.: 666,446

[22] Filed: Mar. 11, 1991

Related U.S. Application Data

[63] Continuation of Ser. No. 347,287, May 4, 1989, abandoned.

[30] Foreign Application Priority Data

| May 6, 1988 | [JP] | Japan | 63-111331 |
| May 17, 1988 | [JP] | Japan | 63-121081 |
| May 17, 1988 | [JP] | Japan | 63-121082 |
| May 17, 1988 | [JP] | Japan | 63-121083 |
| May 17, 1988 | [JP] | Japan | 63-121084 |

[51] Int. Cl.⁵ ............................ G03B 19/12
[52] U.S. Cl. .................. 354/246; 354/249
[58] Field of Search ............. 354/226, 245-249

[56] References Cited

U.S. PATENT DOCUMENTS

4,814,807 3/1989 Nakagawa et al. ............ 354/246

Primary Examiner—Russell E. Adams
Assistant Examiner—David M. Gray
Attorney, Agent, or Firm—Fitzpatrick, Cella, Harper & Scinto

[57] ABSTRACT

A shutter for a camera includes a lever pivotable for operating a shutter, a shutter base plate formed from a synthetic resin, a shaft for pivotally supporting the lever, the shaft and the shutter base plate being formed from a synthetic resin as one unit, and a thick portion formed on the surface of the shutter base plate on which the shaft is formed. The thick portion is formed in the area of the shutter base plate surrounding a congituous shaft so that the shaft surrounding area is made thicker than the area surrounding an aperture of the shutter base plate.

21 Claims, 4 Drawing Sheets

SHUTTER FOR CAMERA

This application is a continuation of application Ser. No. 07/347,287 filed May 4, 1989, now abandoned.

BACKGROUND OF THE INVENTION

1. Field of the Invention

This invention relates to a shutter for a camera of the type in which a shutter base plate is made of a synthetic resin.

2. Description of the Related Art

Figure 3:
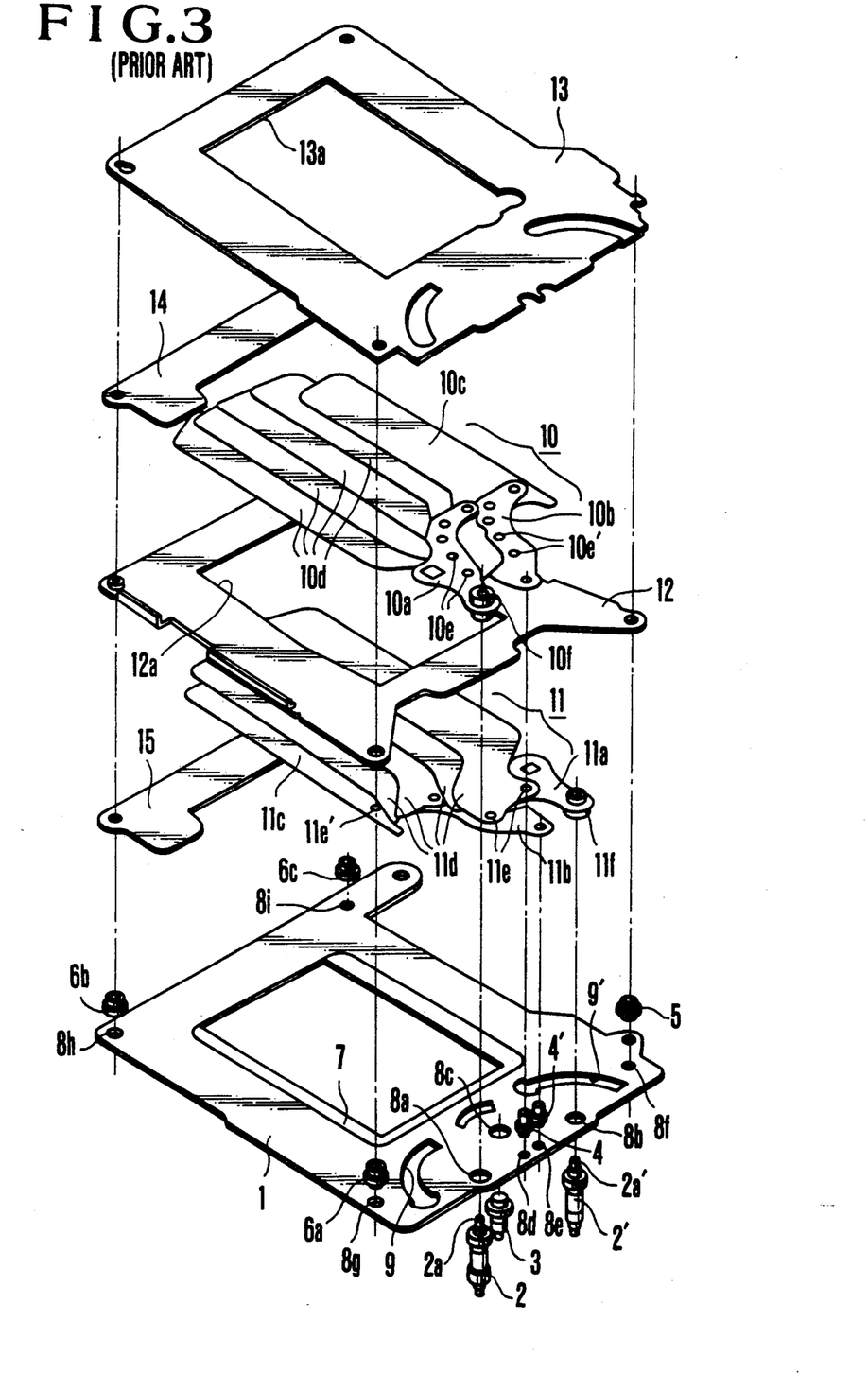
FIG. 3 is a perspective view of a conventional shutter as seen when looking from the side of groups of blades.

FIG. 3 of the drawing shows a conventional focal-plane shutter for use in a camera.

In this focal-plane shutter, on a shutter base plate 1 are mounted blade driving lever shafts 2 and 2' with main arm rotating shafts 2a and 2a' respectively, formed at one end thereof, a charge lever shaft 3 which serves as the rotational center of a charge lever (not shown) for charging the blade driving lever shafts 2 and 2', auxiliary arm rotating shafts 4 and 4', and shafts 5 and 6a, 6b and 6c through which a cover plate 13 is mounted on the shutter base plate 1. The shutter base plate 1 has an aperture 7 formed therein. The above-described shafts 2, 2', 3, 4, 4', 5, 6a, 6b and 6c are respectively fitted in holes 8a to 8i formed in the shutter base plate 1 by means of caulking. Holes 9 and 9', along which the charge lever (not shown) is pivoted, are also formed in the shutter base plate 1. A group of leading blades 10 includes a slit forming blade 10c and separate blades 10d. The blades 10c and 10d are linked to a main arm 10a and an auxiliary arm 10b through caulked portions 10e and 10e'. The main arm 10a is pivotally supported on the main arm rotating shaft 2a of the blade driving lever shaft 2, and the auxiliary arm 10b is pivotally supported on the auxiliary arm rotating shaft 4. A group of trailing blades 11 includes a slit forming blade 11c and separate blades 11d. The blades 11c and 11d are linked to a main arm 11a and an auxiliary arm 11b through caulked portions 11e and 11e'. The main arm 11a is pivotally supported on the main arm rotating shaft 2a', whereas the auxiliary arm 11b is pivotally supported on the auxiliary arm rotating shaft 4'. A partitioning plate 12 is disposed between the group of leading blades 10 and the group of trailing blades 11 so as to prevent any interference between the two groups. The partitioning plate 12 has an opening 12a corresponding to the aperture 7. A cover plate 13 is made of a thin metal plate, as is the shutter base plate 1. The cover plate 13 has an opening 13a corresponding to the aperture 7. In order to ensure smooth movement of the blades 10 and 11, the leading ends of the blades 10c, 10d, 11c and 11d are arranged to slide along spacers 14 and 15.

In the above-described conventional shutter structure, since the blade driving lever shafts 2 and 2', the charge lever shaft 3, the auxiliary arm rotating shafts 4 and 4', and the shafts 5, 6a, 6b and 6c must be caulked in the holes 8a to 8i formed in the shutter base plate 1, the manufacture of a shutter base plate unit is a time-consuming task, which increases the cost of production.

Accordingly, it has been proposed to reduce production costs and simplify the shutter manufacturing processes by preparing a shutter base plate with the above-described various shafts formed integrally therewith by the molding of a synthetic resin. However, the shutter base plate is a thin member. A shutter base plate formed by the molding of a synthetic resin may be deformed by the application of force to the blade driving levers or the charge lever. Such deformation of the shutter base plate will adversely affect the operation of the blades, deteriorating the precision of a shutter exposure (shutter time), and in the worst case, causing breakage of the shutter base plate due to its insufficient strength.

Molding of a synthetic resin into a shutter base plate with integrally formed shafts is proposed in the specification of Japanese Laid-Open Utility Model Application NO. Sho 58-16625.

However, the shutter base plate proposed in the above-described application has a configuration in which a plurality of thin pressed metal plates are laminated on top of each other or in which a thin metal plate is inserted in the synthetic resin that forms a shutter base plate during the molding so as to increase its strength, and it is not prepared by merely molding a synthetic resin. A shutter base plate formed solely by molding a synthetic resin is disclosed in the specification of U.S. patent application Ser. No. 217,649 filed on Jul. 12, 1988.

In the shutter structure shown in FIG. 3, the edge portion of the aperture 7 of the shutter base plate 1 must be bevelled to form a bevelled portion 7a. This secondary machining is required to make the blades operate smoothly. Furthermore, the shutter base plate 1 is made of a metallic material, and the end surface thereof is made flat. These aspects increase the intensity of harmful light reflected by the end surface, increasing the possibility that a photographic film will be adversely affected by reflected light.

Figure 6:
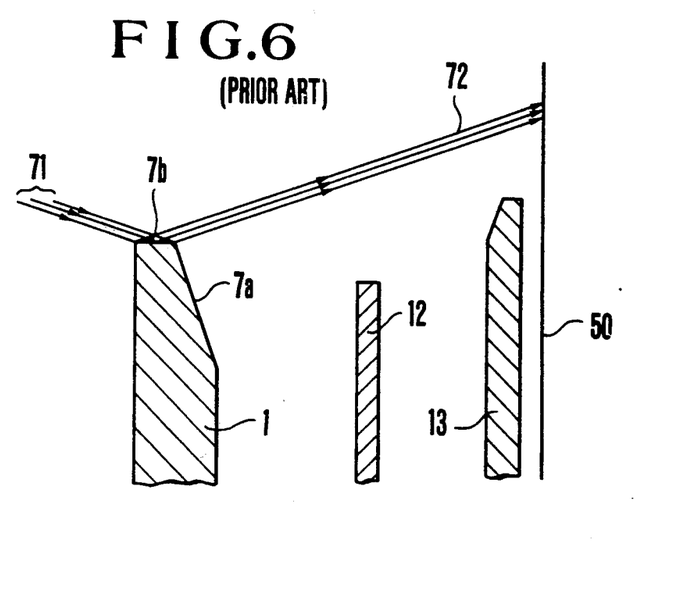
FIG. 6 is an enlarged end view of the vicinity of an aperture, illustrating the adverse effect of harmful light in the shutter of FIG. 3.

This adverse affect on the film in the conventional shutter shown in FIG. 3 will be described below in detail with reference to FIG. 6. Since the shutter base plate 1 is mounted on a lensboard unit of a camera body, harmful light 71 that has passed through a lens and that is incident on the shutter from the side of the shutter base plate 1 is reflected by a flat end surface 7b of the aperture 7. The reflected light 72 reaches a film 50 located on the side of the cover plate 13.

Consequently, a reflection preventing coating is required on a conventional camera shutter. Further, it is impossible to block harmful reflected light completely by the coating conventionally applied in a conventional camera shutter.

SUMMARY OF THE INVENTION

The present invention provides in one aspect a shutter for a camera in which shafts for pivotally supporting levers are integrally formed with a shutter base plate and in which the thickness of the vicinity of the shaft mounting portions of the shutter base plate is increased in order to increase the strength thereof.

DETAILED DESCRIPTION OF THE PREFERRED EMBODIMENT

An embodiment of the present invention will be described below with reference to the accompanying drawings.

Figure 1:
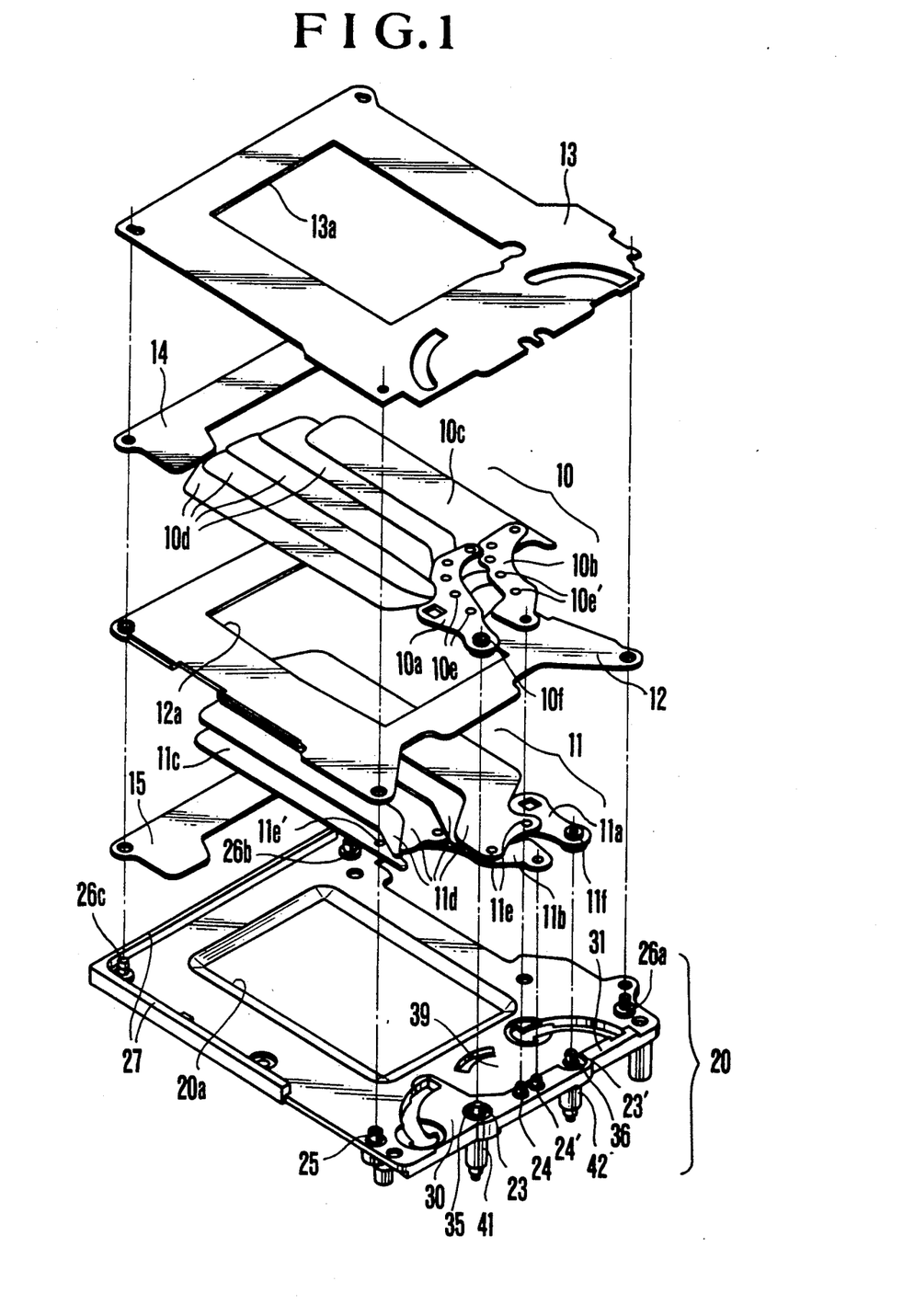
FIG. 1 is a perspective view of a shutter as seen when looking from the side of groups of the blades, showing an embodiment of the present invention.
Figure 2:
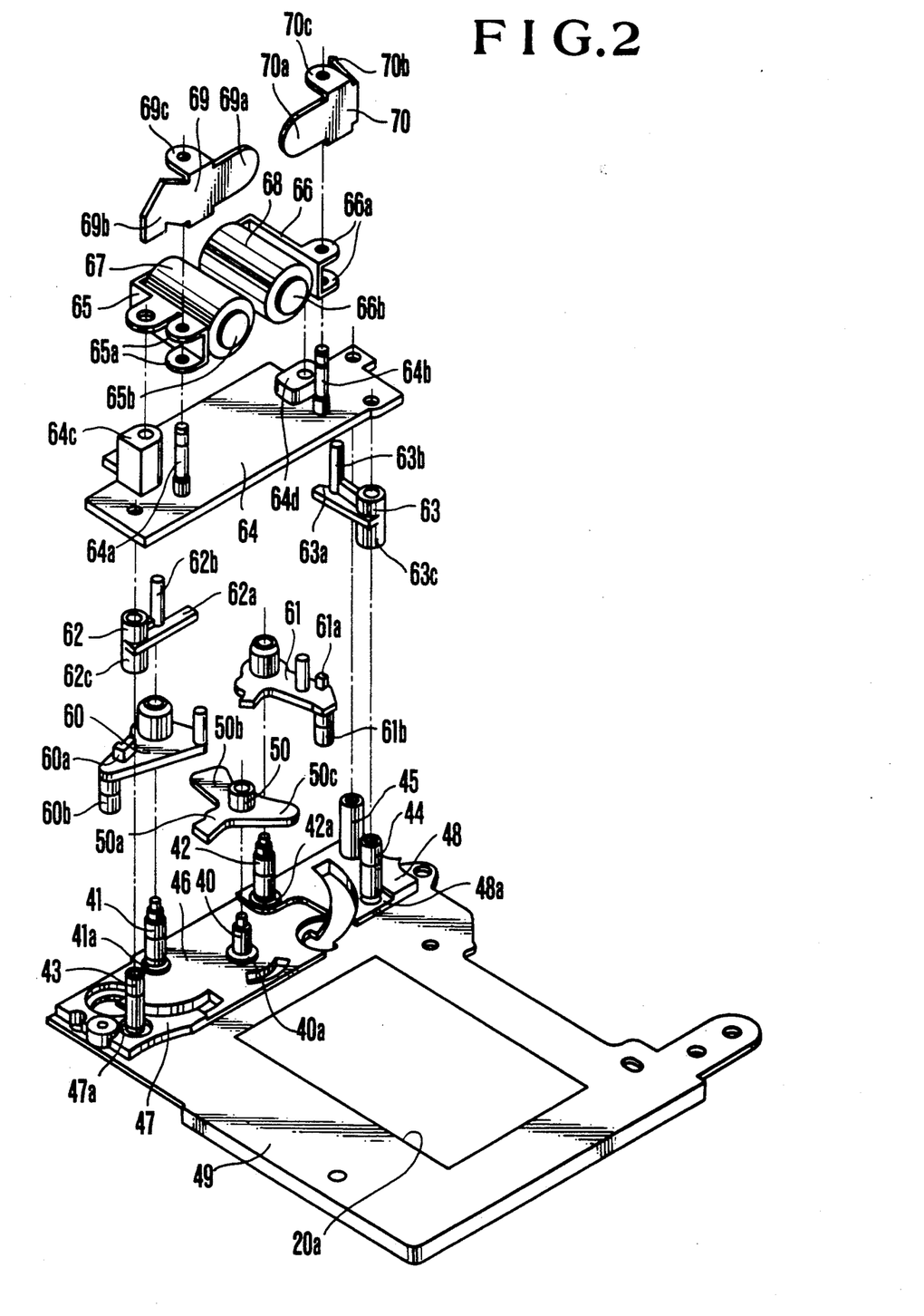
FIG. 2 is a perspective view of the shutter of FIG. 1 as seen when looking from the side of the driving levers.
Figure 4:
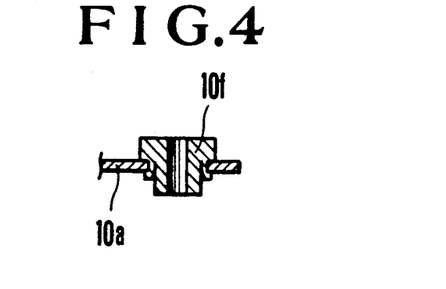
FIG. 4 is a cross-sectional view of the essential parts of a main arm of FIG. 1.

Referring first to FIGS. 1 and 2, a shutter base plate 20 is formed of a synthetic resin such as liquid crystal polymer (LCP). The shutter base plate 20 has main arm rotating shafts 23 and 23', auxiliary arm rotating shafts 24 and 24' and cover plate mounting shafts 25, 26a, 26b and 26c formed thereon. The shutter base plate 20 also has a rib 27 and thick portions 30 and 31 formed thereon. The thick portions are formed on the rear side of shafts 41 and 42 to be described later in an area surrounding the shafts with the exception of an operation area 39 of main arms 10a, 11a and auxiliary arms 10b, 11b. The rib 27 and the thick portions 30 and 31 are formed along the edge of the shutter base plate 20 in the range in which they do not block the operation of groups of blades 10 and 11 so as to increase the strength of the shutter base plate 20 (to prevent warp and breakage) and improve its flatness. Very close areas 35 and 36 surrounding the main arm rotating shafts 23 and 23' are not made thick so that arm bearings 10f and 11f (see FIG. 4) can be closely fitted on the main arm rotating shafts 23 and 23' without increasing the overall thickness of the shutter. The shutter base plate 20 also has a shaft 40 which is the rotational center of a charge lever 50 for charging both a leading blade driving lever 60 and a trailing blade driving lever 61, a shaft 41 which is the rotational center of the leading blade driving lever 60 for driving the group of leading blades 10, a shaft 42 which is the rotational center of the trailing blade driving lever 61 for driving the group of trailing blades 11, a shaft 43' which is the rotational center of a leading drive bracing lever 62 for checking the motion of the leading blade driving lever 60, a shaft 44' which is the rotational center of a trailing drive bracing lever 63 for checking the motion of the trailing blade driving lever 61, and a shaft 45 on which a base plate 64 for an electromagnet is mounted. The base plate 64 is mounted on the shafts 43, 44 and 45 by means of screws (not shown). The shutter base plate 20 also has thick portions 46, 47 and 48 which are thicker than an area 49 surrounding an aperture 20a. The formation of the thick portions 46, 47 and 48 is limited to the vicinity of the shafts 40, 41, 42, 43, 44 and 45 to which force is applied. A yoke 65 for generating a suction force together with a coil 67 and a yoke 66 for generating a suction force together with a coil 68 are both fixed to the base plate 64. Armatures 69 and 70 are rotatably supported on shafts 64a and 64b of the base plate 64. Attraction of the armatures 69 and 70 to the yokes 65 and 66 causes shafts 62b and 63b of the bracing levers 62 and 63 to operate. The operation of the shafts 62b and 63b starts the motion of the leading and trailing blade driving levers 60 and 61.

The shafts 23, 23', 24, 24', 25, 26a, 26b, 26c, 40, 41, 42, 43, 44, and 45, the rib 27 and the thick portions 46, 47 and 48 are formed integrally with the shutter base plate 20. More specifically, the shutter base plate 20 is formed as the one with integrally formed shafts 23, 23', 24, 24', 25, 26a, 26b, 26c, 40, 41, 42, 43, 44, and 45, eliminating the caulking process required in the conventional manufacturing art.

The shutter will be charged in the manner described below. A leg 50c of the charging lever 50 is urged by a charge transmitting member (not shown) of a camera body and thereby starts rotating clockwise as viewed in FIG. 2. As the charging lever 50 is rotated clockwise as viewed in FIG. 2, legs 50a and 50b of the charging lever 50 respectively come into contact with the leading and trailing blade driving levers 60 and 61, thereby rotating the driving levers 60 and 61 counterclockwise as viewed in FIG. 2 against a driving spring force (not shown). As the rotation of the driving levers 60 proceeds, braced portions 60a and 61a of the driving levers 60 and 61 become respectively engaged with bracing portions 62a and 63a of the bracing levers 62 and 63, and are braced at their charged position, thereby completing the charging of the shutter.

At that time, since the driving levers 60 and 61 are rotated against a very large spring force, a large force is exerted on the shafts 40, 41 and 42 during the charging. If the rigidity of the shutter base late 20 is low, the shutter base plate 20 may therefore be deformed (warped), causing the shafts to fall. This increases a charge stroke and thus causes energy loss, or insufficient charging.

Further, after the completion of charging, the driving levers 60 and 61 are respectively braced by the bracing levers 62 and 63, and this causes a large driving force to be exerted on the shafts 41, 42, 43 and 44. Consequently, deformation, i.e., warping occurring in the shutter base plate 20 may deviate the start position of the groups of blades 10 and 11 or the timing at which bracing is released and thus deteriorate precision of the shutter operation.

However, in this embodiment, the thick portions 46, 47 and 48 are formed in the area surrounding the shafts to which a force is exerted, and the thick portions 30 and 31 are formed on the surface (shown in FIG. 1) of the shutter base plate 20 on which the blade groups are disposed in the range in which they do not block the movement of the blade groups, i.e., excluding the operation area 39 of the arms and in an area surrounding the rear sides of the shafts 41 and 42. Consequently, a resultant shutter base plate 20 exhibits a very high rigidity and is not readily deformed by the force exerted on the above-described shafts, in particular, on the shafts 41 and 42. Further, the thick portions 30 and 31 are connected to each other, and this allows stress applied to the shutter base plate 20 to be dispersed, decreasing the possibility that the shutter base plate 20 will be deformed due to the force applied to the shafts 41 and 42. Accordingly, even if the aperture surrounding area 49 located on the surface (shown in FIG. 2) of the shutter base plate 20 on which the driving levers are provided has substantially the same thickness as that of the conventional metal base plate, a resultant shutter base plate exhibits a high rigidity. The provision of the thick portions does not substantially increase the overall thickness of the shutter in a camera. Further, the overall flatness of the shutter base plate 20 is ensured by the provision of the rib 27 on the surface of the shutter base plate 20 (shown in FIG. 1) on which the blade groups are provided. The rib 27 is formed between the shutter base plate 20 and the cover plate 13. Consequently, even if the height of the rib 27 is increased so that it reaches the cover plate 13, the volume thereof in a camera does not increase at all.

In this embodiment, the thickness of the thick portion 46 is made slightly smaller than that of the thick portions 47 and 48 because it forms a pivot area for the charging lever 50 and the leading and trailing blade driving levers 60 and 61. This prevents the one end portion of the shutter base plate 20 on which the various levers and the electromagnet are disposed from becoming higher than necessary.

In order to further reinforce the shafts 40, 41 and 42, circular thick portions 40a, 41a and 42a are formed at the base of the shafts 40, 41 and 42. Since the shafts 40 and 41 are located on the thick portion 46 which is slightly thinner than the thick portions 47 and 48, the circular thick portions 40a and 41a for the shafts 40 and 41 are made slightly higher than the thick portion 42a to balance the strength of the shafts 40, 41 and 42.

The areas 35 and 36 surrounding the main arm rotating shafts 23 and 23' for rotatably supporting the main arms 10a and 11a remain thin so that the arm bearings 10f and 11f can be fitted onto the main arm rotating shafts 23 and 23' sufficiently. This also prevents an increase in the overall thickness of the shutter. However, since the thick portions 30 and 31 are connected with each other into a rib-like form, fall of the shafts 23 and 23' (also the shafts 41 and 42) and the warp of the shutter base plate 20 can be prevented.

Further, a large force is not exerted on the bracing levers 62 and 63. In consequence, thin areas 47a and 48a of the shafts 43 and 44 for rotatably supporting the bracing levers 62 and 63 are made thinner than the other areas, i.e., the thick portions 47 and 48 so that bearings 62c and 63c of the bracing levers 62 and 63 can be fitted into these thin areas 47a and 48a. In this way, the bracing levers 62 and 63 can be fitted onto the shafts 43 and 44 along a longer distance, decreasing the possibility of fall of the shafts 43 and 44. However it is to be noted that, since the areas 47a and 48a are thicker than the aperture surrounding area 49, they exhibit sufficient strength.

The edge portion of the aperture 20a forms a bevelled portion 33a which ensures the smooth travel of the group of trailing blades 11.

Figure 5:
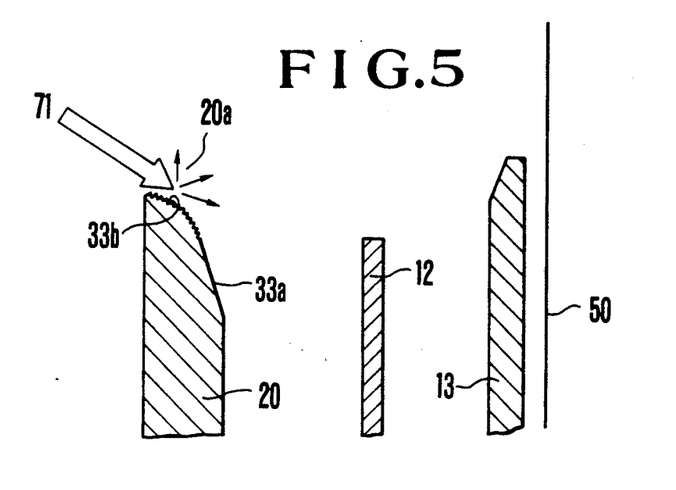
FIG. 5 is an enlarged end view of the vicinity of an aperture, illustrating the adverse effect of harmful light in the shutter of FIG. 1.

An end surface 33b of the aperture 20a has irregularities, as shown in FIG. 5. This irregular end surface 33b allows harmful light 71 that is incident on the shutter from the side of the shutter base plate 20 to be dispersed, blocking the light 71 from reaching a film 50. In consequence, the reflection preventing coating, which is conventionally applied to the end surface of the aperture formed in the shutter base plate, can be practically eliminated, and this enables the number of manufacturing processes and the production costs to be greatly reduced. Elimination of the reflection-preventive coating is very effective from the viewpoint of the manufacturing process, eliminating the masking and setting processes required for coating.

Further, a shutter base plate 20 with integrally formed irregular end surface 33b can be formed by molding a synthetic resin, so that the formation of the irregular end surface 33b does not increase the cost of production at all.

The above-described embodiment exemplifies a shutter of the type in which a lens is disposed on the side of the shutter base plate 20 while the film 50 is located on the side of the cover plate 13. However, formation of an irregular end surface 33b is effective in a shutter of the type in which a lens and a film are disposed reversely.

What is claimed is:

1. A shutter for a camera, comprising:
   levers pivotable for operating a shutter;
   a shutter base plate formed from a synthetic resin and having an aperture formed therein;
   shafts for pivotally supporting said lever, said shafts being formed from a synthetic resin integrally with said shutter base plate; and
   a thick portion formed on a surface of said shutter base plate on which said shafts are protrusively formed, said thick portion being formed continuously around and between said shafts so that said thick portion is made thicker than an area surrounding said aperture of said shutter base plate.

2. A shutter according to claim 1, further comprising a group of shutter blades, wherein said lever is a driving lever for driving said group of shutter blades.

3. A shutter according to claim 1, wherein said lever is a charging lever for charging a driving lever for driving a group of shutter blades.

4. A shutter according to claim 1, wherein said shafts are formed in the vicinity of one side of said shutter base plate and integrally with said shutter base plate, a rib being protrusively formed at another side of said shutter base plate on said surface of said shutter base plate on which said shafts are protrusively formed.

5. A shutter for a camera, comprising:
   a first group of shutter blades;
   a first driving lever for driving said first group of shutter blades;
   a second group of shutter blades;
   a second driving lever for driving said second group of shutter blades;
   a shutter base plate formed from a synthetic resin and having an aperture formed therein;
   a first shaft for pivotally supporting said first driving lever, said first shaft being formed from a synthetic resin integrally with said shutter base plate in the vicinity of one end portion thereof;
   a second shaft for pivotally supporting said second driving lever, said second shaft being formed from a synthetic resin integrally with said shutter base plate in the vicinity of said one end portion thereof; and
   a thick portion formed in the vicinity of said one end portion of said shutter base plate, said thick portion being formed continuously around and between said first and second shafts so that said first and second shafts is made thicker than an area surrounding said aperture of said shutter base plate.

6. A shutter according to claim 1, wherein said thick portion is provided on each of two surfaces of said shutter base plate.

7. A shutter according to claim 5, further comprising a rib formed on another end portion of said shutter base plate.

8. A shutter according to claim 7, wherein said rib is formed on a surface of said shutter base plate opposite to that on which said first and second shafts are protrusively formed.

9. A shutter for a camera, comprising:
   a group of shutter blades supported by an arm;
   a driving lever for driving said group of shutter blades;
   a shutter base plate formed from a synthetic resin;
   a shaft for pivotally supporting said driving lever, said shaft being formed from a synthetic resin integrally with said shutter base plate on a first surface of said base plate; and
   a thick portion formed on a second surface of said shutter base plate opposite to said first surface thereof on which said shaft is protrusively formed, said thick portion being formed at a position immediately opposite to said shaft and away from a travelling area of said arm, said thick portion having a thickness larger than that of the travelling area of said arm.

10. A shutter according to claim 9, wherein said thick portion is positioned in the vicinity of one end of said shutter base plate.

11. A shutter according to claim 10, further comprising a rib formed at another end of said shutter base plate.

12. A shutter for a camera, comprising:
 a first group of shutter blades supported by a first arm;
 a first driving lever for driving said first group of shutter leading blades;
 a second group of shutter blades supported by a second arm;
 a second driving lever for driving said second group of shutter trailing blades;
 a shutter base plate formed from a synthetic resin;
 a first shaft for pivotally supporting said first driving lever, said first shaft being formed from a synthetic resin integrally with said shutter base plate on a first surface of said shutter base plate;
 a second shaft for pivotally supporting said second driving lever, said second shaft being formed from a synthetic resin integrally with said shutter base plate on said first surface of said shutter base plate;
 a first thick portion formed on a second surface of said shutter base plate immediately opposite to said first surface thereof on which said first shaft is formed in the vicinity of a position just opposite to said first shaft; and
 a second thick portion formed on said second surface of said shutter base plate immediately opposite to said first surface thereof on which said second shaft is formed in the vicinity of a position just opposite to said second shaft,
 wherein said first and second thick portions are connected, and the thickness of said first and second thick portions is made larger than that of an area on which said first and second arms travel.

13. A shutter according to claim 12, wherein said first and second thick portions are positioned in the vicinity of one end of said shutter base plate.

14. A shutter according to claim 13, further comprising:
 a rib formed on another end of said shutter base plate.

15. A shutter for a camera, comprising:
 a shutter base plate formed from a synthetic resin;
 a shaft for supporting said shutter member, said shaft being formed from a synthetic resin integrally with said shutter base plate; and
 a shutter member fitted onto said shaft;
 an area provided on said base plate for bearing said shutter member fitted onto said shaft;
 a thick portion formed in an area of said shutter base plate, said thick portion having an opening for receiving said shaft, said thick portion being immediately opposite to a portion of said shutter member in which said shaft is formed other than said area provided for bearing said shutter member fitted onto said shaft.

16. A shutter according to claim 15, wherein said shaft is capable of pivotally supporting an arm for supporting a group of shutter blades.

17. A shutter for a camera, comprising:
 a shutter base plate formed from a synthetic resin;
  a shaft for supporting a shutter member, said shaft being formed from a synthetic resin integrally with said shutter base plate; and
  an area provided on said base plate for bearing said shutter member fitted onto said shaft;
  a thick portion formed in an area of said shutter base plate surrounding said shaft, said thick portion having a thickness (A) which is larger than a thickness (B) of an area of said shutter base plate surrounding an aperture (A>B), and a thickness (C) of said shutter base plate at which said bearing area of said shutter member fitted onto said shaft is located being larger than said thickness (B) and smaller than said thickness (A), such that (A>C>B).

18. A shutter for a camera, comprising:
 a shutter base plate formed from a synthetic resin;
 a plurality of shutter members;
 a plurality of shafts for supporting said plurality of shutter members, said plurality of shafts being formed from a synthetic resin integrally with said shutter base plate; and
 a plurality of areas provided on said base plate for bearing said plurality of shutter members fitted onto said plurality of shafts;
 thick portions formed in areas surrounding said shafts other than said bearing areas at which said plurality of shutter members fitted onto said plurality of shafts are located, said thick portions being connected with each other to form a rib-like shaft at one end of said shutter base plate.

19. A shutter for a camera, comprising:
 a group of shutter blades;
 a driving lever for driving said group of shutter blades;
 a charging lever for charging said driving lever;
 a shutter base plate formed from a synthetic resin and having an aperture formed therein;
 a driving lever shaft for pivotally supporting said driving lever, said driving lever shaft being formed from a synthetic resin integrally with said shutter base plate;
 a charging lever shaft for pivotally supporting said charging lever, said charging lever shaft being formed from a synthetic resin integrally with said shutter base plate; and
 a thick portion being formed in an area of said shutter base plate continuously around and between said shafts, said thick portion having a thickness larger than that of an area surrounding said aperture of said shutter base plate, and said area surrounding said driving lever shaft being made thicker than a pivoting area of said charging lever.

20. A shutter according to claim 19, wherein said driving lever shaft and said charging lever shaft are disposed in the vicinity of an end portion of one surface of said shutter base plate.

21. A shutter according to claim 20, further comprising a rib formed at an end portion of another surface of said shutter base plate.

* * * * *

UNITED STATES PATENT AND TRADEMARK OFFICE
CERTIFICATE OF CORRECTION

PATENT NO.  : 5,159,371
DATED       : October 27, 1992
INVENTOR(S) : FUKUDA

Page 1 of 2

It is certified that error appears in the above-identified patent and that said Letters Patent is hereby corrected as shown below:

AT [57] ABSTRACT

Line 8, "congituous" should read --contiguous--.

COLUMN 1

Line 13, "drawing" should read --drawings--.
Line 17, "2a'" should read --2a',--.

COLUMN 2

Line 4, "and" should read --and,--.
Line 32, "affect" should read --effect--.

COLUMN 3

Line 39, "shaft 43'" should read --shaft 43,--.
Line 41, "shaft 44'" should read --shaft 44,--.

COLUMN 4

Line 11, "driving levers 60" should read --driving levers 60 and 61--.
Line 20, "late 20" should read --plate 20--.
Line 29, "warping" should read --warping,--.

COLUMN 5

Line 29, "48" should read --48,--.
Line 34, "However" should read --However,--.

UNITED STATES PATENT AND TRADEMARK OFFICE
CERTIFICATE OF CORRECTION

PATENT NO. : 5,159,371
DATED : October 27, 1992
INVENTOR(S) : FUKUDA

It is certified that error appears in the above-identified patent and that said Letters Patent is hereby corrected as shown below:

<u>COLUMN 6</u>

Line 3, "lever," should read --levers,--.
Line 46, "is" should read --are--.

<u>COLUMN 7</u>

Line 54, "said" (first occurrence) should read --a--.

<u>COLUMN 8</u>

Line 35, "shaft" should read --shape--.

Signed and Sealed this

Sixteenth Day of November, 1993

Attest:

BRUCE LEHMAN

Attesting Officer       Commissioner of Patents and Trademarks